US012588066B2

(12) United States Patent
Choi

(10) Patent No.: US 12,588,066 B2
(45) Date of Patent: Mar. 24, 2026

(54) DEVICE AND METHOD FOR PERFORMING RANDOM ACCESS IN NON-TERRESTRIAL NETWORK SYSTEM

(71) Applicant: UUCOM CO., LTD, Gwacheon (KR)

(72) Inventor: Su Han Choi, Gwacheon-si (KR)

(73) Assignee: UUCOM CO., LTD., Gwacheon (KR)

( * ) Notice: Subject to any disclaimer, the term of this patent is extended or adjusted under 35 U.S.C. 154(b) by 404 days.

(21) Appl. No.: 18/016,617

(22) PCT Filed: Jul. 15, 2021

(86) PCT No.: PCT/KR2021/009140
§ 371 (c)(1),
(2) Date: Jan. 17, 2023

(87) PCT Pub. No.: WO2022/015089
PCT Pub. Date: Jan. 20, 2022

(65) Prior Publication Data
US 2023/0292367 A1    Sep. 14, 2023

(30) Foreign Application Priority Data

Jul. 16, 2020    (KR) ........................ 10-2020-0088301
Jul. 12, 2021    (KR) ........................ 10-2021-0090858

(51) Int. Cl.
*H04W 74/08*        (2024.01)
*H04L 27/26*        (2006.01)
(Continued)

(52) U.S. Cl.
CPC ........ *H04W 74/0833* (2013.01); *H04W 84/06* (2013.01)

(58) Field of Classification Search
CPC ............... H04W 74/0833; H04W 84/06; H04J 13/0062; H04J 13/14; H04J 13/22
See application file for complete search history.

(56) References Cited

U.S. PATENT DOCUMENTS 11,979,919 B2 * 5/2024 Saha ................... H04L 27/2607
2008/0235314 A1 * 9/2008 Lee ......................... H04L 5/023
708/426
(Continued)

FOREIGN PATENT DOCUMENTS

WO        2019/161044        8/2019

OTHER PUBLICATIONS

EEE, "Overcoming 5G PRACH Capacity Shortfall: Supersets of Zadoff-Chu Sequences With Low-Correlation Zone", Sep. 2020 (Year: 2020).*
(Continued)

*Primary Examiner* — Christopher M Crutchfield
*Assistant Examiner* — Aixa A Guadalupe Cruz
(74) *Attorney, Agent, or Firm* — INVENSTONE PATENT, LLC

(57)        ABSTRACT

Disclosed are a device and method for performing a random access in a non-terrestrial network system. A wireless transmission and reception method performed by a user equipment according to an embodiment of the present invention comprises the steps of: receiving random access channel (RACH) configuration information from a network node, wherein the RACH configuration information includes zero correlation zone (ZCZ) configuration information indicating at least one cyclic shift value (Ncs) among a plurality of cyclic shift values to be used for generating a random access preamble, the plurality of cyclic shift values are divided into a first set and a second set according to the cell coverage to which the value is applied, and the second set is applied to a cell coverage larger than the first set; generating the random access preamble on the basis of the Ncs, transmitting the random access preamble to the network node; receiving a response message to the random access preamble from the network node; and transmitting a message to the network node on the basis of the response message.

10 Claims, 11 Drawing Sheets

(51) Int. Cl.
    *H04W 74/0833*        (2024.01)
    *H04W 84/06*          (2009.01)

(56)                References Cited

U.S. PATENT DOCUMENTS

| | | | |
|---|---|---|---|
| 2016/0255652 A1* | 9/2016 | Noh ...................... | H04W 64/00 |
| | | | 370/329 |
| 2020/0413451 A1* | 12/2020 | Taherzadeh Boroujeni ................ | |
| | | | H04B 7/18504 |
| 2022/0377804 A1* | 11/2022 | Mann ................ | H04W 74/0833 |

OTHER PUBLICATIONS

Ericsson, 'Introduction of enhancements to operation in unlicensed spectrum', R1-1807930, 3GPP TSG RAN WGI #93, Busan, Korea, Jun. 7, 2018.

Samsung, 'Uplink timing advance/RACH procedure and Initial Access for NTN', R1-1908488, 3GPP TSG RAN WGI #98. Prague, CZ, Aug. 16, 2019.

Huawei et al., 'Discussion on Doppler compensation, timing advance and RACH for NTN', R1-1908049, 3GPP TSG RAN WGI #98, Aug. 17, 2019.

Qualcomm Incorporated, 'RACH Procedure and UL Timing Control for NTN', R1-1911115, 3GPP TSG RAN WGI #98b, Oct. 5, 2019.

International Search Report for International Application No. PCT/KR2021/009140, dated Oct. 6, 2021.

* cited by examiner

Figure 7:
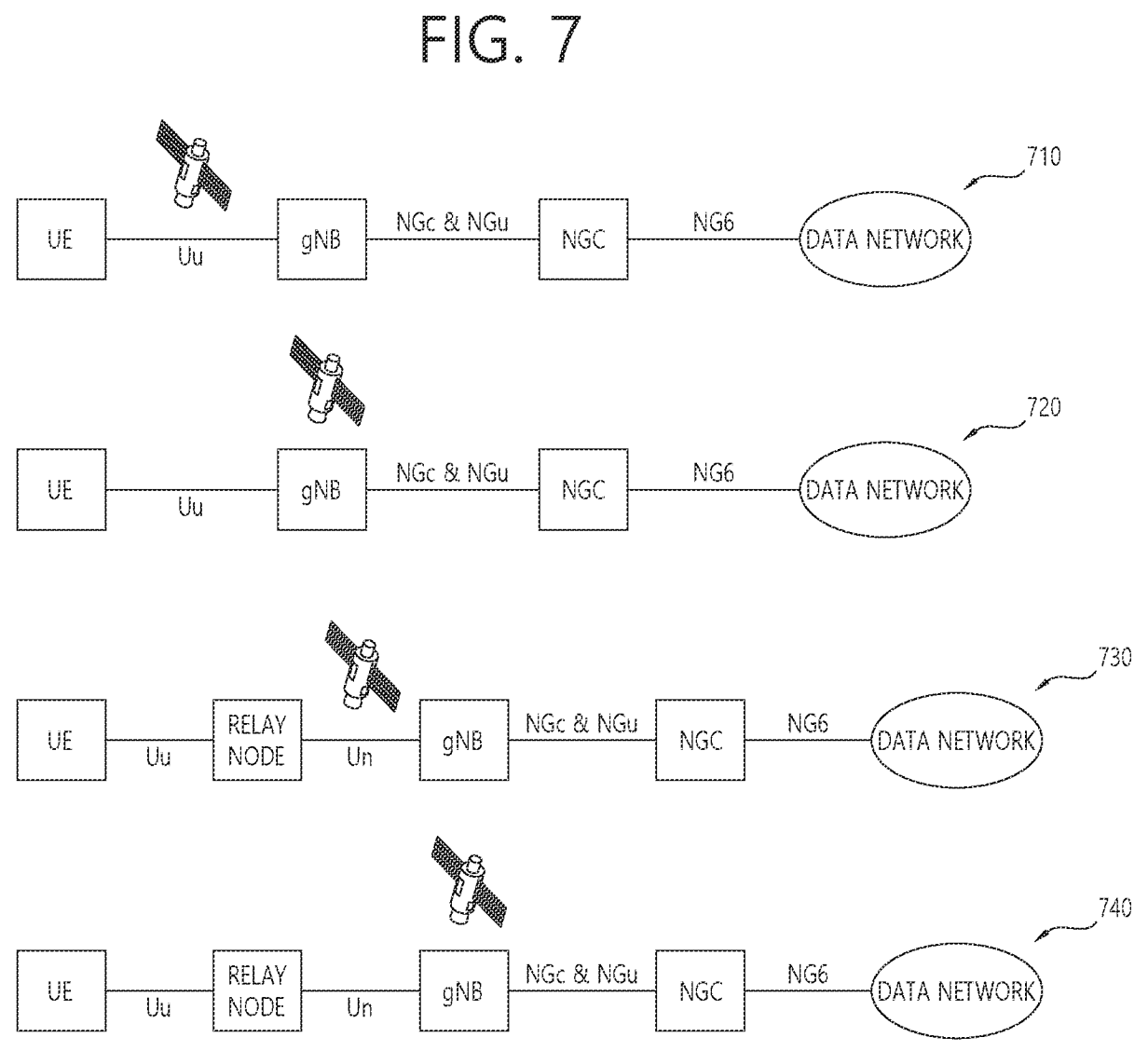

DATA NETWORK

NG6

NGC

NGc & NGu gNB

Uu

UE

720

DATA NETWORK

NG6

NGC

NGc & NGu gNB

Uu

UE

730

DATA NETWORK

NG6

NGC

NGc & NGu gNB

Un

RELAY NODE

Uu

UE

740

DATA NETWORK

NG6

NGC

NGc & NGu gNB

Un

RELAY NODE

Uu

UE

DEVICE AND METHOD FOR PERFORMING RANDOM ACCESS IN NON-TERRESTRIAL NETWORK SYSTEM

BACKGROUND

Field

The present disclosure relates to a wireless communication system, and more particularly, to an apparatus and method for performing random access in a non-terrestrial network system.

Related Art

3GPP opened a new field for the commercial application of 5G by completing the first global 5G New Radio (NR) standard in Release (Rel)-15. In addition, NR-based non-terrestrial networks (NTNs) have been considered to be one of the evolutionary stages of NR for the revitalization of 5G and the expansion of the ecosystem. NTN's extensive service coverage capabilities and reduced vulnerability to physical attacks and natural disasters on its space/aerospace platforms enable NTN to deliver 5G services in a cost-effective manner in areas where terrestrial 5G networks are not available (isolated or remote areas, aboard aircraft or ships) and in areas where services are weak (suburbs or rural areas). It also provides service continuity to passengers aboard M2M and IoT devices or mobile platforms (aircraft, ships, high-speed trains, buses, etc.), or enables reliable 5G service support that is ubiquitous for key communications such as rail, sea, and air communications of the future. In addition, efficient multicast/broadcast resources for data delivery to a network edge or user equipment can be provided to support the availability of 5G networks. These benefits can be provided through a stand-alone NTN or an integrated network of terrestrial and non-terrestrial and are expected to have an impact in areas such as transportation, public safety, media and entertainment, eHealth, energy, agriculture, finance, and automotive.

SUMMARY

The present disclosure is to provide an apparatus and method for performing random access in a non-terrestrial network system.

According to an aspect of the present disclosure, a wireless transmission and reception method, performed by a user equipment, is provided. The method includes receiving, from a network node, random access channel (RACH) configuration information, wherein the RACH configuration information includes zero correlation zone (ZCZ) configuration information that indicates at least one cyclic shift value (Ncs) among a plurality of cyclic shift values used for generating a random access preamble, wherein the plurality of cyclic shift values is divided into a first set and a second set according to a cell coverage applied thereto, and wherein the second set is applied to a cell coverage larger than the first set; generating a random access preamble based on the Ncs, transmitting, to the network node, the random access preamble, receiving, from the network node, a response message in response to the random access preamble, and transmitting, to the network node, a message based on the response message.

According to another aspect of the present disclosure, the first set is applied to a cell of a terrestrial network (TN), and the second set is applied to a cell of a non-terrestrial network (NTN).

According to still another aspect of the present disclosure, generating the random access preamble further includes: generating a Zadoff Chu (ZC) sequence based on the Ncs value; and generating the random access preamble by using the ZC sequence.

According to still another aspect of the present disclosure, the RACH configuration information further includes restricted set configuration information that represents whether the user equipment belongs to one of an unrestricted set, restricted set A, or restricted set B, and wherein the random access preamble is determined based on a combination of the Ncs value and the restricted set configuration information.

According to still another aspect of the present disclosure, the ZCZ configuration information is configured with 5-bit that indicates an index between 0 to 31.

According to still another aspect of the present disclosure, the Ncs value is included in the first set when the index is 0 to 15, and wherein the Ncs value is included in the second set when the index is 0 to 31.

According to still another aspect of the present disclosure, the method further includes receiving, from the network node, flag information that indicates whether a set of cyclic shift values used by the network node or the user equipment is the first set or the second set.

According to still another aspect of the present disclosure, the first set is applied to a cell of a terrestrial network (TN), and the second set is applied to a cell of a non-terrestrial network (NTN).

According to still another aspect of the present disclosure, the RACH configuration information includes flag information that indicates whether a set of cyclic shift values used by the network node or the user equipment is the first set or the second set.

According to still another aspect of the present disclosure, the first set is applied to a terrestrial network (TN), and the second set is applied to a non-terrestrial network (NTN).

According to still another aspect of the present disclosure, a user equipment for performing wireless transmission and reception is provided. The user equipment includes a transceiver configured to: receive, from a network node, random access channel (RACH) configuration information, wherein the RACH configuration information includes zero correlation zone (ZCZ) configuration information that indicates at least one cyclic shift value (Ncs) among a plurality of cyclic shift values used for generating a random access preamble, wherein the plurality of cyclic shift values is divided into a first set and a second set according to a cell coverage applied thereto, and wherein the second set is applied to a cell coverage larger than the first set, transmit, to the network node, the random access preamble, receive, from the network node, a response message in response to the random access preamble, and transmit, to the network node, a message based on the response message, and a processor configured to generate the random access preamble based on the Ncs.

According to still another aspect of the present disclosure, the first set is applied to a cell of a terrestrial network (TN), and the second set is applied to a cell of a non-terrestrial network (NTN).

According to still another aspect of the present disclosure, the processor is configured to generate a Zadoff Chu (ZC) sequence based on the Ncs value and generate the random access preamble by using the ZC sequence.

According to still another aspect of the present disclosure, wherein the RACH configuration information further includes restricted set configuration information that represents whether the user equipment belongs to one of an unrestricted set, restricted set A, or restricted set B, and wherein the random access preamble is determined based on a combination of the Ncs value and the restricted set configuration information.

According to still another aspect of the present disclosure, the ZCZ configuration information is configured with 5-bit that indicates an index between 0 to 31.

According to still another aspect of the present disclosure, the Ncs value is included in the first set when the index is 0 to 15, and wherein the Ncs value is included in the second set when the index is 0 to 31.

According to still another aspect of the present disclosure, the transceiver further receives, from the network node, flag information that indicates whether a set of cyclic shift values used by the network node or the user equipment is the first set or the second set.

According to still another aspect of the present disclosure, the first set is applied to a cell of a terrestrial network (TN), and the second set is applied to a cell of a non-terrestrial network (NTN).

According to still another aspect of the present disclosure, the RACH configuration information includes flag information that indicates whether a set of cyclic shift values used by the network node or the user equipment is the first set or the second set.

According to still another aspect of the present disclosure, the first set is applied to a terrestrial network (TN), and the second set is applied to a non-terrestrial network (NTN).

According to still another aspect of the present disclosure, a wireless transmission and reception method, performed by a network node, is provided. The method includes transmitting, to a user equipment, random access channel (RACH) configuration information, wherein the RACH configuration information includes zero correlation zone (ZCZ) configuration information that indicates at least one cyclic shift value (Ncs) among a plurality of cyclic shift values used for generating a random access preamble, wherein the plurality of cyclic shift values is divided into a first set and a second set according to a cell coverage applied thereto, and wherein the second set is applied to a cell coverage larger than the first set, receiving, from the user equipment, the random access preamble generated based on the Ncs, transmitting, to the user equipment, a response message in response to the random access preamble, and receiving, from the user equipment, a message transmitted based on the response message.

According to still another aspect of the present disclosure, a network node for performing wireless transmission and reception is provided. The network node includes a transceiver configured to generate random access channel (RACH) configuration information, wherein the RACH configuration information includes zero correlation zone (ZCZ) configuration information that indicates at least one cyclic shift value (Ncs) among a plurality of cyclic shift values used for generating a random access preamble, wherein the plurality of cyclic shift values is divided into a first set and a second set according to a cell coverage applied thereto, and wherein the second set is applied to a cell coverage larger than the first set, transmit, to a user equipment, the RACH configuration information, receive, from the user equipment, the random access preamble generated based on the Ncs, transmit, to the user equipment, a response message in response to the random access preamble, and receive, from the user equipment, a message transmitted based on the response message, and a processor configured to generate a response message in response to the RACH configuration information and the random access preamble.

Technical Effect

The present disclosure may decrease the performance degradation in performing random access in a non-terrestrial network system.

BRIEF DESCRIPTION OF THE DRAWINGS

FIG. 7 is a diagram for describing various forms of a non-terrestrial network structure to which an embodiment can be applied.

DESCRIPTION OF EXEMPLARY EMBODIMENTS

Figure 1:
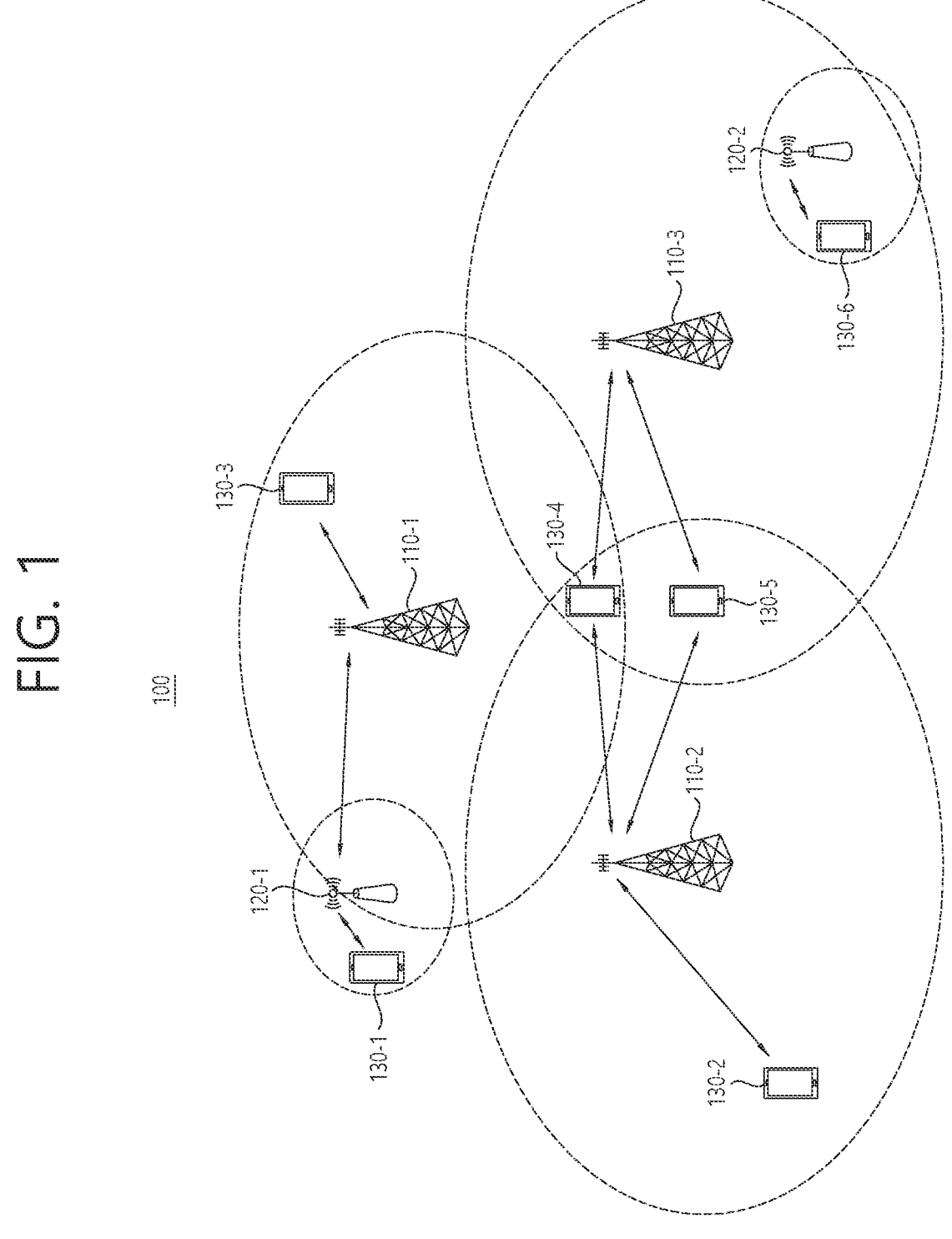
FIG. 1 is a conceptual diagram illustrating a wireless communication system according to an embodiment of the present disclosure.

While the present invention is susceptible to various modifications and alternative forms, specific embodiments thereof are shown by way of example in the drawings. However, the present invention should not be construed as limited to the embodiments set forth herein, but on the contrary, the disclosure is to cover all modifications, equivalents, and alternatives falling within the spirit and scope of the embodiments. In describing each figure, like reference numerals are used for like elements.

While terms, such as "first", "second", "A", "B," etc. may be used to describe various components, such components must not be limited by the above terms. The above terms are used only to distinguish one component from another. For example, without departing from the scope of the present invention, a first component may be referred to as a second component, and similarly, a second component may also be referred to as a first component. Further, the term "and/or" includes combinations of a plurality of related listed items or any of a plurality of related listed items.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The terms used in the present description are merely used in order to describe particular embodiments, and are not intended to limit the scope of the present invention. An element described in the singular form is intended to include a plurality of elements unless the context clearly indicates otherwise. In the present description, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Unless otherwise defined, all terms including technical and scientific terms used in the present description have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Hereinafter, preferred embodiments according to the present invention will be described in detail with reference to the accompanying drawings.

FIG. 1 is a conceptual diagram illustrating a wireless communication system according to an embodiment of the present invention.

Referring to FIG. 1, the wireless communication system 100 may include a plurality of communication nodes 110-1, 110-2, 110-3, 120-1, 120-2, 130-1, 130-2, 130-3, 130-4, 130-5, and 130-6.

Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier (SC)-FDMA based communication protocol, a non-orthogonal multiplexing access (NOMA) based communication protocol, a space division multiple access (SDMA) based communication protocol, and the like.

The wireless communication system 100 may include a plurality of base stations 110-1, 110-2, 110-3, 120-1, and 120-2 and a plurality of UEs 130-1, 130-2, 130-3, 130-4, 130-5, and 130-6).

Each of the first base station 110-1, the second base station 110-2, and the third base station 110-3 may form a macro cell. Each of the fourth base station 120-1 and the fifth base station 120-2 may form a small cell. The fourth base station 120-1, the third UE 130-3, and the fourth UE 130-4 may belong to the coverage of the first base station 110-1. The second UE 130-2, the fourth UE 130-4, and the fifth UE 130-5 may belong to the coverage of the second base station 110-2. The fifth base station 120-2, the fourth UE 130-4, the fifth UE 130-5, and the sixth UE 130-6 may belong to the coverage of the third base station 110-3. The first UE 130-1 may belong to the coverage of the fourth base station 120-1. The sixth UE 130-6 may belong to the coverage of the fifth base station 120-2.

Here, each of the plurality of base stations 110-1, 110-2, 110-3, 120-1, and 120-2 may also be called a NodeB, an evolved NodeB, a next generation Node B (gNB), a base transceiver station (BTS), a radio base station, a radio transceiver, an access point, an access node, a road side unit (RSU), a digital unit (DU), a cloud digital unit (CDU), a radio remote head (RRH), a radio unit (RU), a transmission point (TP), a transmission and reception point (TRP), a relay node, and the like. Each of the plurality of UEs 130-1, 130-2, 130-3, 130-4, 130-5, and 130-6 may also be called a user equipment, an access terminal, a mobile terminal, a station, a subscriber station, a mobile station, a portable subscriber station, a node, a device, and the like.

The plurality of communication nodes 110-1, 110-2, 110-3, 120-1, 120-2, 130-1, 130-2, 130-3, 130-4, 130-5, and 130-6 may support long term evolution (LTE), LTE-Advanced (LTE-A), New Radio (NR), and the like defined in cellular communication (e.g., 3rd generation partnership project (3GPP)) standards. The plurality of base stations 110-1, 110-2, 110-3, 120-1, and 120-2 may operate in different frequency bands or may operate in the same frequency band. The plurality of base stations 110-1, 110-2, 110-3, 120-1, and 120-2 may be connected to each other through an ideal backhaul or a non-ideal backhaul and may exchange information through an ideal backhaul or a non-ideal backhaul. Each of the plurality of base stations 110-1, 110-2, 110-3, 120-1, and 120-2 may be connected to a core network (not shown) through an ideal backhaul or a non-ideal backhaul. Each of the plurality of base stations 110-1, 110-2, 110-3, 120-1, and 120-2 may transmit a signal received from the core network to corresponding UEs 130-1, 130-2, 130-3, 130-4, 130-5, and 130-6 and transmit signals received from the corresponding UEs 130-1, 130-2, 130-3, 130-4, 130-5, and 130-6 to the core network.

Each of the plurality of base stations 110-1, 110-2, 110-3, 120-1, and 120-2 may support OFDM-based downlink transmission, and may support OFDM or DFT-Spread-OFDM-based uplink transmission. In addition, each of the plurality of base stations 110-1, 110-2, 110-3, 120-1, and 120-2 may support multiple input multiple output (MIMO) (e.g., single user (SU)-MIMO, multi-user (MU)-MIMO, massive MIMO, etc.), coordinated multipoint (CoMP) transmission, carrier aggregation transmission, transmission in an unlicensed band, device-to-device (D2D) communication (or proximity services (ProSe)), and the like. Here, each of the plurality of UEs 130-1, 130-2, 130-3, 130-4, 130-5, and 130-6 may perform operations corresponding to the base stations 110-1, 110-2, 110-3, 120-1, and 120-2 and/or operations supported by the base stations 110-1, 110-2, 110-3, 120-1, and 120-2.

For example, the second base station 110-2 may transmit a signal to the fourth UE 130-4 based on SU-MIMO, and the fourth UE 130-4 may receive the signal from the second base station 110-2 according to SU-MIMO. The second base station 110-2 may transmit a signal to the fourth UE 130-4 and the fifth UE 130-5 based on MU-MIMO, and the fourth UE 130-4 and the fifth UE 130-5 may receive the signal from the second base station 110-2 according to MU-MIMO. Each of the first base station 110-1, the second base station 110-2, and the third base station 110-3 may transmit a signal to the fourth UE 130-4 based on CoMP, and the fourth UE 130-4 may receive signals from the first base station 110-1, the second base station 110-2, and the third base station 110-3 according to CoMP. Each of the plurality of base stations 110-1, 110-2, 110-3, 120-1, and 120-2 may transmit/receive a signal to/from the UEs 130-1, 130-2, 130-3, 130-4, 130-5, and 130-6 belonging to the coverage thereof based on CA.

Each of the first base station 110-1, the second base station 110-2, and the third base station 110-3 may coordinate D2D communication with the fourth UE 130-4 and the fifth UE 130-5, and each of the fourth UE 130-4 and the fifth UE 130-5 may perform D2D communication according to coordination of each of the second base station 110-2 and the third base station 110-3.

When a method (e.g., transmission or reception of a signal) performed by a first communication node among communication nodes is described, a second communication node corresponding thereto may perform a method (e.g., reception or transmission of a signal) corresponding to the method performed by the first communication node. That is, when the operation of a UE is described, the corresponding base station may perform the operation corresponding to the operation of the UE. On the other hand, when the operation of a base station is described, the corresponding UE may perform the operation corresponding to the operation of the base station.

Hereinafter, downlink (DL) means communication from a base station to a UE, and uplink (UL: uplink) means communication from a UE to a base station. In downlink, a transmitter may be a part of a base station and a receiver may be a part of a UE. In uplink, a transmitter may be a part of a UE and a receiver may be a part of a base station.

With the recent rapid spread of smartphones and Internet of Things (IoT) UEs, the amount of information exchanged through a communication network is increasing. Accordingly, it is necessary to consider an environment (e.g., enhanced mobile broadband communication) that provides faster services to more users than the existing communication system (or the existing radio access technology) in next-generation wireless access technology. To this end, design of a communication system in consideration of machine type communication (MTC) providing services by connecting a plurality of devices and objects is under discussion. In addition, design of a communication system (e.g., ultra-reliable and low latency communication (URLLC)) considering services and/or UEs sensitive to communication reliability and/or latency is under discussion.

Hereinafter, for convenience of description, the next-generation radio access technology is referred to as new radio access technology (RAT), and a wireless communication system to which the new RAT is applied is referred to as a New Radio (NR) system in the present description. In the present description, frequencies, frames, subframes, resources, resource blocks, regions, bands, subbands, control channels, data channels, synchronization signals, various reference signals, various signals or various messages related to NR may be interpreted in various meanings used in the past and present or will be used in the future.

Figure 2:
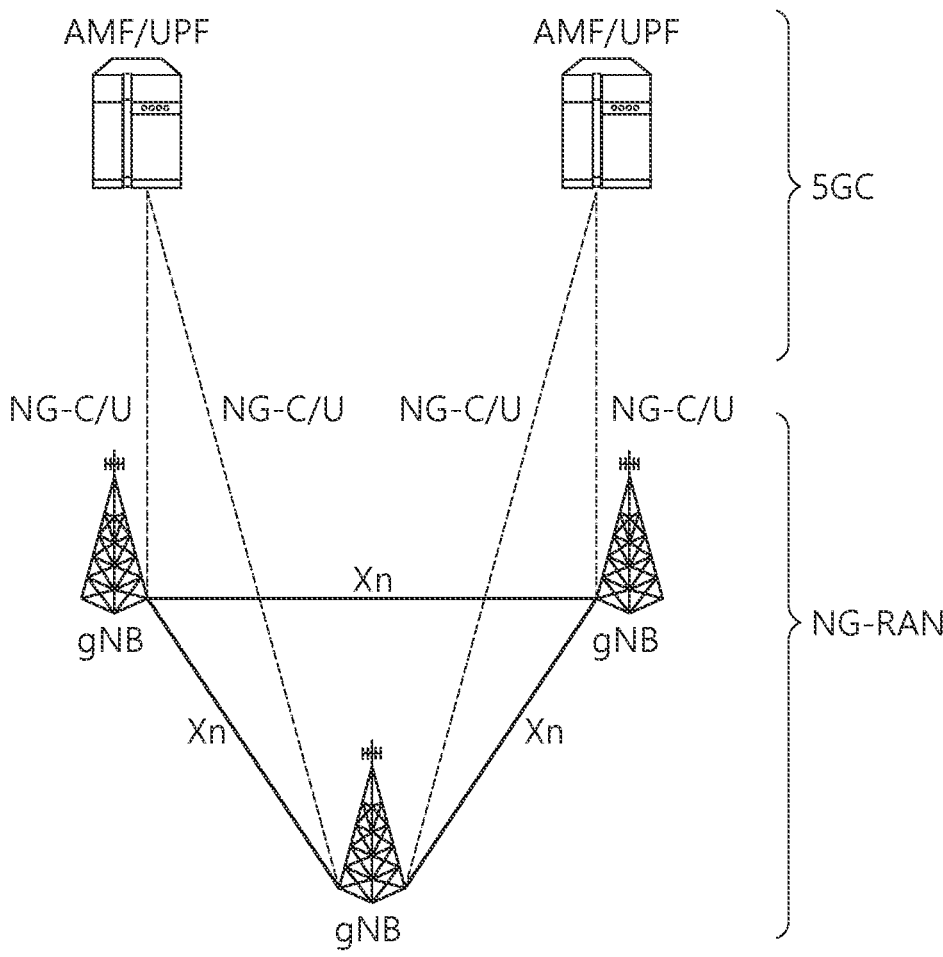
FIG. 2 is an exemplary diagram showing an NR system to which a data transmission method according to an embodiment of the present disclosure can be applied.

FIG. 2 is an exemplary diagram showing an NR system to which a data transmission method according to an embodiment of the present invention can be applied.

NR, which is next-generation wireless communication technology that is being standardized in 3GPP, provides an improved data rate compared to LTE and can satisfy various QoS requirements for each segmented and detailed usage scenario. In particular, enhanced mobile broadband (eMBB), massive MTC (mMTC), and ultra-reliable and low latency communications (URLLC) have been defined as representative usage scenarios of NR. As a method for satisfying requirements for each scenario, a frame structure that is flexible compared to LTE is provided. The frame structure of NR supports a frame structure based on multiple subcarriers. A basic subcarrier spacing (SCS) is 15 kHz, and a total of 5 types of SCS are supported at 15 kHz*$2^n$ (n=0, 1, 2, 3, 4).

Referring to FIG. 2, a next generation-radio access network (NG-RAN) includes gNBs that provide an NG-RAN user plane (SDAP/PDCP/RLC/MAC/PHY) and control plane (RRC) protocol termination for UEs. Here, NG-C represents a control plane interface used for an NG2 reference point between NG-RAN and 5-generation core (5GC). NG-U represents a user plane interface used for an NG3 reference point between NG-RAN and 5GC.

The gNBs are interconnected through the Xn interface and connected to the 5GC through an NG interface. More specifically, a gNB is connected to an access and mobility management function (AMF) through the NG-C interface and connected to a user plane function (UPF) through the NG-U interface.

In the NR system of FIG. 2, multiple numerologies may be supported. Here, numerology may be defined by a subcarrier spacing and a cyclic prefix (CP) overhead. In this case, a plurality of subcarrier spacings may be derived by scaling the basic subcarrier spacing with an integer. Further, even though it is assumed that a very low subcarrier spacing is not used at a very high carrier frequency, a numerology to be used can be selected independently of the frequency band.

In addition, in the NR system, various frame structures according to a number of numerologies may be supported.

<NR Waveform, Numerology, and Frame Structure>

In NR, a CP-OFDM waveform using a cyclic prefix is used for downlink transmission, and CP-OFDM or DFT-S-OFDM is used for uplink transmission. OFDM technology is easy to combine with MIMO (Multiple Input Multiple Output) and has advantages of using a low-complexity receiver with high frequency efficiency.

In NR, since requirements for a data rate, a delay rate, coverage, and the like are different for each of the three scenarios described above, it is necessary to efficiently satisfy the requirements for each scenario through a frequency band constituting an arbitrary NR system. To this end, technology for efficiently multiplexing radio resources based on a plurality of different numerologies has been proposed.

Specifically, NR transmission numerology is determined based on a sub-carrier spacing and a cyclic prefix (CP) and changed using a value μ as an exponential value of 2 based on 15 kHz as shown in Table 1 below.

TABLE 1

| μ | Subcarrier spacing (kHz) | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1, NR numerologies may be divided into five types according to the subcarrier spacing. This is different from the fact that the subcarrier spacing of LTE, one of the 4G communication technologies, is fixed to 15 kHz. Specifically, subcarrier spacings used for data transmission are 15, 30, 60, and 120 kHz, and subcarrier spacings used for synchronization signal transmission are 15, 30, 120 and 240 kHz in NR. In addition, an extended CP is applied only to the 60 kHz subcarrier spacing. On the other hand, in the frame structure in NR, a frame composed of 10 subframes each having a length of 1 ms and having a length of 10 ms is defined. One frame can be divided into half frames of 5 ms, and each half frame includes 5 subframes. In the case of a 15 kHz subcarrier spacing, one subframe is composed of one slot, and each slot includes 14 OFDM symbols.

<NR Physical Resources>

With respect to physical resources in NR, an antenna port, a resource grid, a resource element, a resource block, a bandwidth part, etc. are considered.

An antenna port is defined such that a channel on which a symbol on an antenna port is carried can be inferred from a channel on which another symbol on the same antenna port is carried. When the large-scale property of a channel carrying a symbol on one antenna port can be inferred from a channel carrying a symbol on another antenna port, the two antenna ports may be regarded as being in a QC/QCL (quasi co-located or quasi co-location) relationship. Here, the large-scale property includes one or more of delay spread, Doppler spread, Doppler shift, average delay, and spatial Rx parameter.

Figure 3:
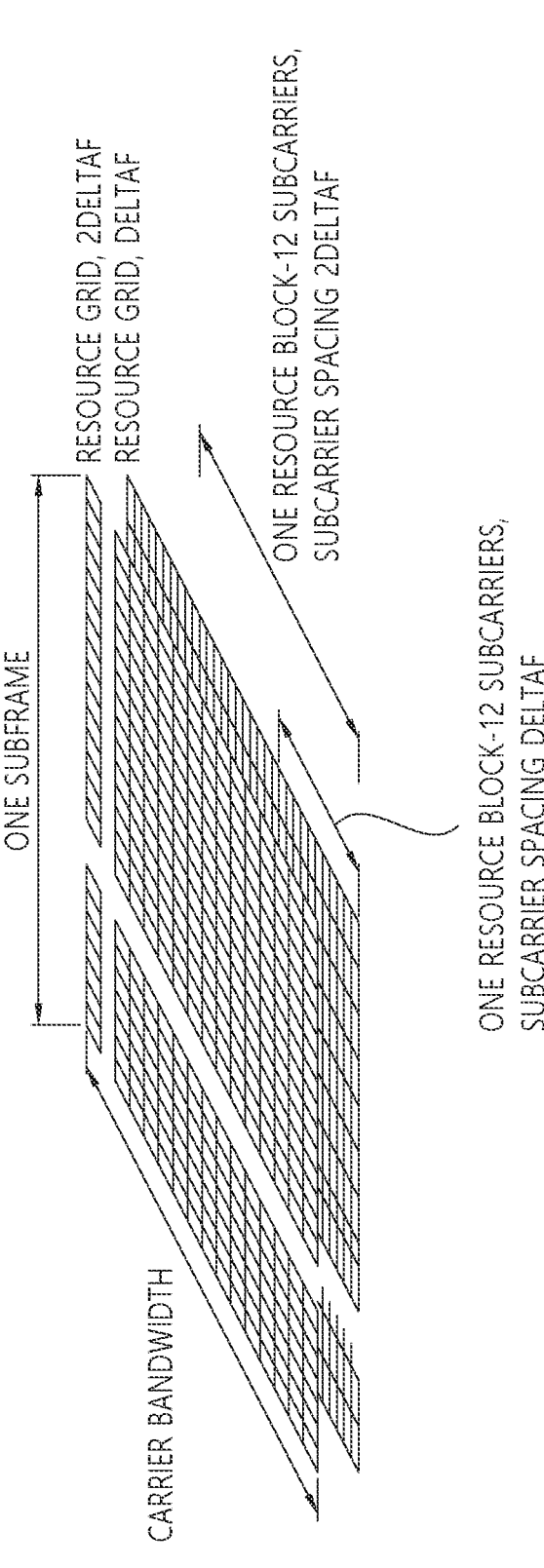
FIG. 3 is a diagram for describing a resource grid supported by the radio access technology to which the present embodiment can be applied.

FIG. 3 is a diagram for describing a resource grid supported by the radio access technology to which the present embodiment can be applied.

Referring to FIG. 3, since NR supports a plurality of numerologies on the same carrier, a resource grid may be present according to each numerology. In addition, the resource grid may be present according to an antenna port, a subcarrier spacing, and a transmission direction.

A resource block is composed of 12 subcarriers and is defined only in the frequency domain. In addition, a resource element is composed of one OFDM symbol and one subcarrier. Accordingly, the size of one resource block may vary according to the subcarrier spacing, as shown in FIG. 3. In addition, "Point A" serving as a common reference point for a resource block grid, a common resource block, a physical resource block, and the like are defined in NR.

Figure 4:
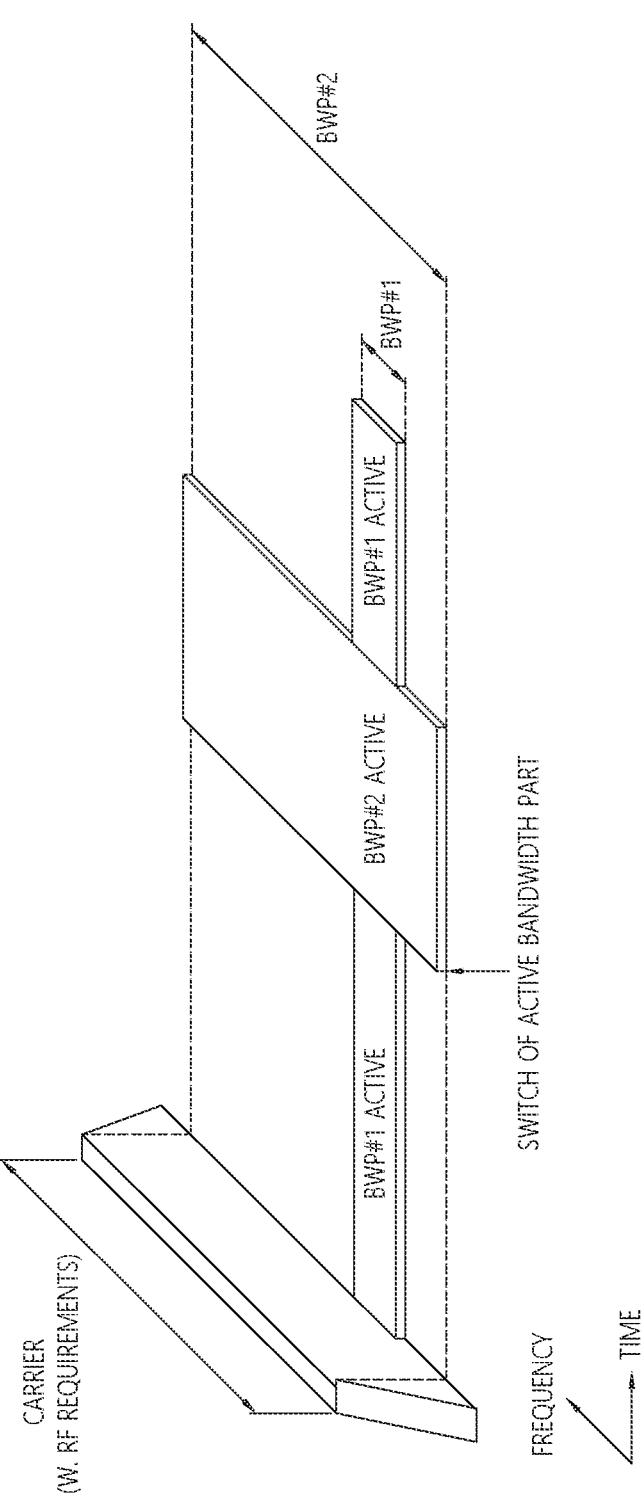
FIG. 4 is a diagram for describing a bandwidth part supported by the radio access technology to which the present embodiment can be applied.

FIG. 4 is a diagram for describing a bandwidth part supported by the radio access technology to which the present embodiment can be applied.

Unlike LTE in which the carrier bandwidth is fixed to 20 MHz, the maximum carrier bandwidth is set to 50 MHz to 400 MHz for each subcarrier spacing in NR. Therefore, it is not assumed that all UEs use all of these carrier bandwidths. Accordingly, as shown in FIG. 4, a bandwidth part (BWP) may be designated within a carrier bandwidth and used by a UE in NR. In addition, a bandwidth part is associated with one numerology and composed of a subset of consecutive common resource blocks, and may be dynamically activated with time. A maximum of four bandwidth parts is configured for a UE in uplink and downlink, and data is transmitted/received using an activated bandwidth part at a given time.

Uplink and downlink bandwidth parts are independently set in the case of a paired spectrum, whereas downlink and uplink bandwidth parts are set in pairs to share a center frequency in order to prevent unnecessary frequency retuning between downlink and uplink operations in the case of an unpaired spectrum.

<NR Initial Access>

In NR, a UE performs cell search and random access procedures in order to access a base station and perform communication.

Cell search is a procedure in which a UE synchronizes with a cell of a corresponding base station using a synchronization signal block (SSB) transmitted by the base station, obtains a physical layer cell ID, and obtains system information.

Figure 5:
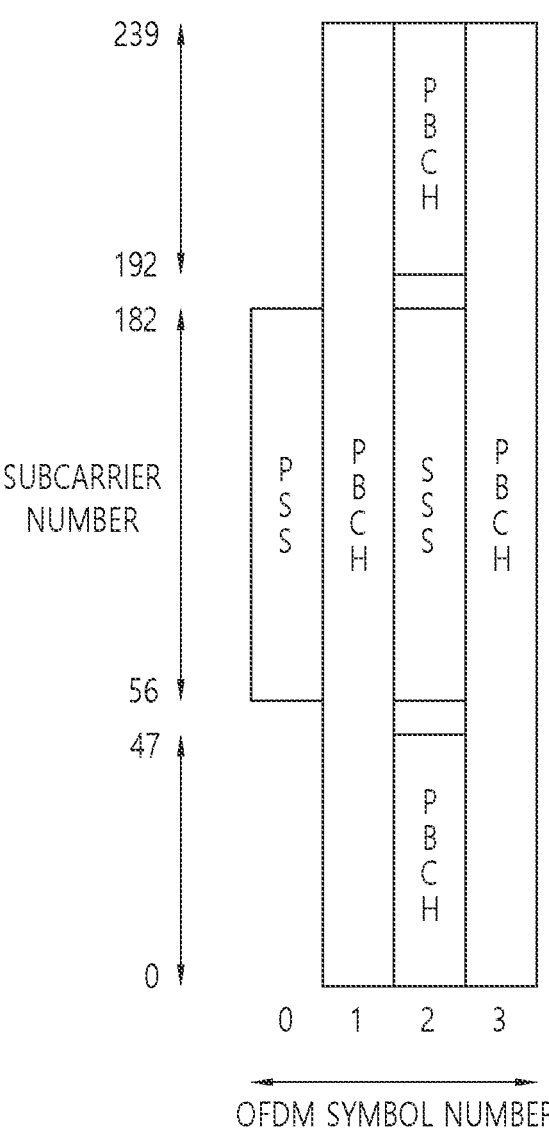
FIG. 5 is a diagram illustrating a synchronization signal block in the radio access technology to which the present embodiment can be applied.

FIG. 5 is a diagram illustrating a synchronization signal block in the radio access technology to which the present embodiment can be applied.

Referring to FIG. 5, the SSB is composed of a primary synchronization signal (PSS) and a secondary synchronization signal (SSS) each occupying one symbol and 127 subcarriers, and a PBCH spanning 3 OFDM symbols and 240 subcarriers.

A UE receives the SSB by monitoring the SSB in the time and frequency domains.

The SSB can be transmitted up to 64 times in 5 ms. A plurality of SSBs is transmitted using different transmission beams within 5 ms, and the UE performs detection on the assumption that SSBs are transmitted every 20 ms when viewed based on one specific beam used for transmission. The number of beams that can be used for SSB transmission within 5 ms may increase as the frequency band increases. For example, a maximum of 4 SSB beams can be transmitted at 3 GHz or less, and SSBs can be transmitted using a maximum of 8 different beams in a frequency band of 3 to 6 GHz and using a maximum of 64 different beams in a frequency band of 6 GHz or more.

Two SSBs are included in one slot, and the start symbol and the number of repetitions in the slot are determined according to a subcarrier spacing as following.

The SSB is not transmitted at the center frequency of a carrier bandwidth, unlike the SS in the conventional LTE. That is, the SSB may be transmitted in a place other than the center of the system band, and a plurality of SSBs may be transmitted in the frequency domain when broadband operation is supported. Accordingly, the UE monitors the SSB using a synchronization raster that is a candidate frequency position for monitoring the SSB. A carrier raster and a synchronization raster, which are center frequency position information of a channel for initial access, are newly defined in NR, and the synchronization raster has a wider frequency interval than the carrier raster and thus can support rapid SSB search of the UE.

The UE may acquire a master information block (MIB) through a PBCH of the SSB. The MIB includes minimum information for the UE to receive remaining minimum system information (RMSI) broadcast by a network. In addition, the PBCH may include information on the position of the first DM-RS symbol in the time domain, information for the UE to monitor SIB1 (e.g., SIB1 numerology information, information related to SIB1 CORESET, search space information, PDCCH related parameter information, etc.), offset information between a common resource block and the SSB (the position of the absolute SSB in a carrier is transmitted through SIB1), and the like. Here, the SIB1 numerology information is equally applied to some messages used in the random access procedure for the UE to access the base station after the UE completes the cell search procedure. For example, the SIB1 numerology information may be applied to at least one of messages 1 to 4 for the random access procedure.

The aforementioned RMSI may mean system information block 1 (SIB1), and SIB1 is periodically broadcast (e.g., 160 ms) in the cell. SIB1 includes information necessary for the UE to perform an initial random access procedure and is periodically transmitted through a PDSCH. To receive SIB1, the UE needs to receive numerology information used for SIB1 transmission and control resource set (CORESET) information used for SIB1 scheduling SIB1 through a PBCH. The UE checks scheduling information for SIB1 using an SI-RNTI in CORESET and acquires SIB1 on the PDSCH according to the scheduling information. SIBs other than SIB1 may be transmitted periodically or may be transmitted according to the request of the UE.

Figure 6:
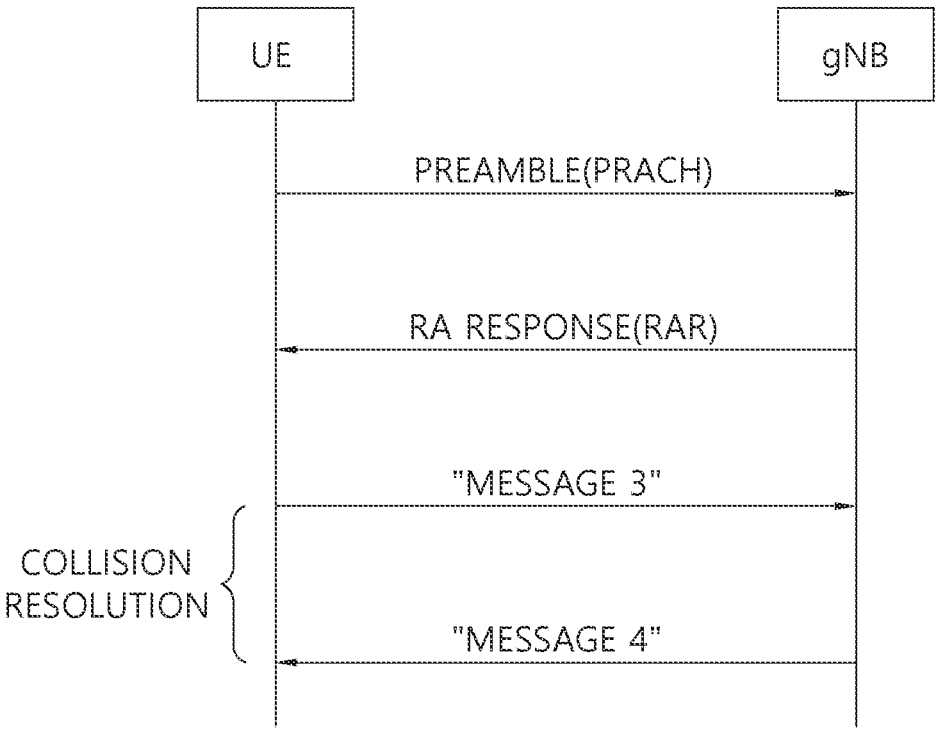
FIG. 6 is a diagram for describing a random access procedure in the radio access technology to which the present embodiment can be applied.

FIG. 6 is a diagram for describing a random access procedure in the radio access technology to which the present embodiment can be applied.

Referring to FIG. 6, upon completion of cell search, the UE transmits a random access preamble for random access to the base station. The random access preamble is transmitted through a PRACH. Specifically, the random access preamble is transmitted to the base station through a PRACH composed of consecutive radio resources in a specific slot that is periodically repeated. In general, when the UE initially accesses the cell, a contention-based random access procedure is performed, and when random access is performed for beam failure recovery (BFR), a contention-free random access procedure is performed.

The UE receives a random access response to the transmitted random access preamble. The random access response may include a random access preamble identifier (ID), a UL grant (uplink radio resource), a temporary cell-radio network temporary identifier (TC-RNTI), and a time advance command (TAC). Since one random access response may include random access response information for one or more UEs, the random access preamble identifier may be included to indicate a UE for which the included UL grant, TC-RNTI, and TAC are valid. The random access preamble identifier may be an identifier for the random access preamble received by the base station. The TAC may be included as information for the UE to adjust uplink synchronization. The random access response may be indicated by a random access identifier on a PDCCH, that is, a random access-radio network temporary identifier (RA-RNTI).

Upon reception of the valid random access response, the UE processes information included in the random access response and performs scheduled transmission to the base station. For example, the UE applies the TAC and stores the TC-RNTI. In addition, the UE transmits data stored in a buffer of the UE or newly generated data to the base station using the UL grant. In this case, information for identifying the UE needs to be included.

Non-Terrestrial Network

A non-terrestrial network refers to a network or a network segment using airborne vehicles such as a high altitude platform (HAPS) or a spaceborne vehicle such as a satellite. According to NTN defined in 3GPP, an artificial satellite is a network node that is connected to a UE through wireless communication and provides a wireless access service to the UE. In one aspect, a satellite in NTN may be configured to perform the same or similar functions and operations as a base station in a terrestrial network. In this case, from the viewpoint of a UE, the artificial satellite may be recognized as another base station. In that respect, the artificial satellite may be included in a base station in a broad sense in the present description. That is, a person skilled in the art can obviously derive an embodiment in which a base station is replaced with a satellite from the embodiments depicting the base station or describing the functions of the base station. Accordingly, even if such embodiments are not explicitly disclosed herein, such embodiments fall within the scope of the present description and the spirit of the present invention.

In 3GPP, technology for supporting NR operation in a non-terrestrial network using the aforementioned satellite or air transport vehicle is being developed. However, in the non-terrestrial network, the distance between a base station and a UE is longer than that in a terrestrial network using terrestrial base stations. Accordingly, a very large round trip delay (RTD) may occur. For example, it is known that RTD is 544.751 ms in an NTN scenario using geostationary earth orbiting (GEO) located at an altitude of 35,768 km, and RTD is 3.053 ms in an NTN scenario using HAPS located at an altitude of 229 km. In addition, RTD in an NTN scenario using a low earth orbiting (LEO) satellite system can be up to 25.76 ms. As such, in order to perform a communication operation to which the NR protocol is applied in a non-terrestrial network, technology for supporting base stations and UEs such that they can perform the NR operation even under such propagation delay.

FIG. 7 is a diagram for describing various forms of a non-terrestrial network structure to which an embodiment can be applied.

Referring to FIG. 7, the non-terrestrial network may be designed in a structure in which a UE performs wireless communication using a device located in the sky. For example, the non-terrestrial network may be implemented in a structure in which a satellite or an air transport device is positioned between a UE and a gNB to relay communication, such as a structure 710. As another example, the non-terrestrial network may be implemented in a structure in which a satellite or an air transport device performs some or all of the functions of a gNB to perform communication with a UE, such as a structure 720. As another example, the non-terrestrial network may be implemented in a structure in which a satellite or an air transport device is positioned between a relay node and a gNB to relay communication, such as a structure 730. As another example, the non-terrestrial network may be implemented in a structure in which a satellite or an air transport device performs some or all of the functions of a gNB to perform communication with a relay node, such as a structure 740.

Accordingly, a component for performing communication with a UE in connection with a core network is described as a network node or a base station in the present description, but this may refer to the aforementioned airborne vehicles or spaceborne vehicles. If necessary, a network node or a base station may mean the same device, or may be used to distinguish different devices according to a non-terrestrial network structure.

That is, a network node or a base station refers to a device for transmitting/receiving data to/from a UE in a non-terrestrial network structure and controlling an access procedure and a data transmission/reception procedure of the UE. Accordingly, when airborne vehicles or spaceborne vehicles perform some or all of the functions of the base station, the network node or the base station may refer to an airborne vehicle or a spaceborne vehicle. Alternatively, when airborne vehicles or spaceborne vehicles execute a function of relaying signals of separate terrestrial base stations, the network node or the base station may refer to a terrestrial base station.

Each embodiment provided below may be applied to an NR UE through an NR base station or may be applied to an LTE UE through an LTE base station. In addition, each embodiment provided below may be applied to an LTE UE connected to an eLTE base station connected through a 5G system (or 5G core network), and applied to an E-UTRA NR dual connectivity (EN-DC) UE or an NR E-UTRA dual connectivity (NE-DC) UE that simultaneously provides LTE and NR wireless connection.

Random Access Procedure in a Non-Terrestrial Network

For the uplink synchronization configuration in NR, a UE may transmit a random access preamble for a RACH occasion (RO) to a corresponding network node, and the network node may receive the random access preamble, and then, apply the random access preamble for a synchronization configuration with the UE through a timing advance (TA) estimation. The UE may transmit random access preambles in different times according to delay time differences with the network node, and various random access preamble formats and random access preamble monitoring periods according to various scenarios may be set to the network node to detect multiple random access preambles separately.

The random access preamble may be generated by using a Zadoff-Chu (ZC) sequence, which is an orthogonal sequence having good correlation property. The ZC sequence is generated based on a root index, and a base station needs to broadcast an available root index to the UE in advance. Since multiple ZC sequences generated by a cyclic shift (hereinafter, referred to CS) of a root index have orthogonality with each other, the ZC sequences are also called a Zero Correlation Zone (ZCZ). And the configuration of a CS to be a predetermined spacing (sample) of the ZC sequence is referred to as a ZCZ configuration.

A CS length, which is applied to generate a ZC sequence, that is, a ZCZ length of a ZC sequence must be longer than a round trip delay time and a length of a channel delay spread. However, when a cell radius increases as in the NTN, due to the influence of a propagation delay, round trip delay, and/or a delay spread, the number of ZC sequences which maintains the orthogonality through a CS may decrease.

Figure 8:
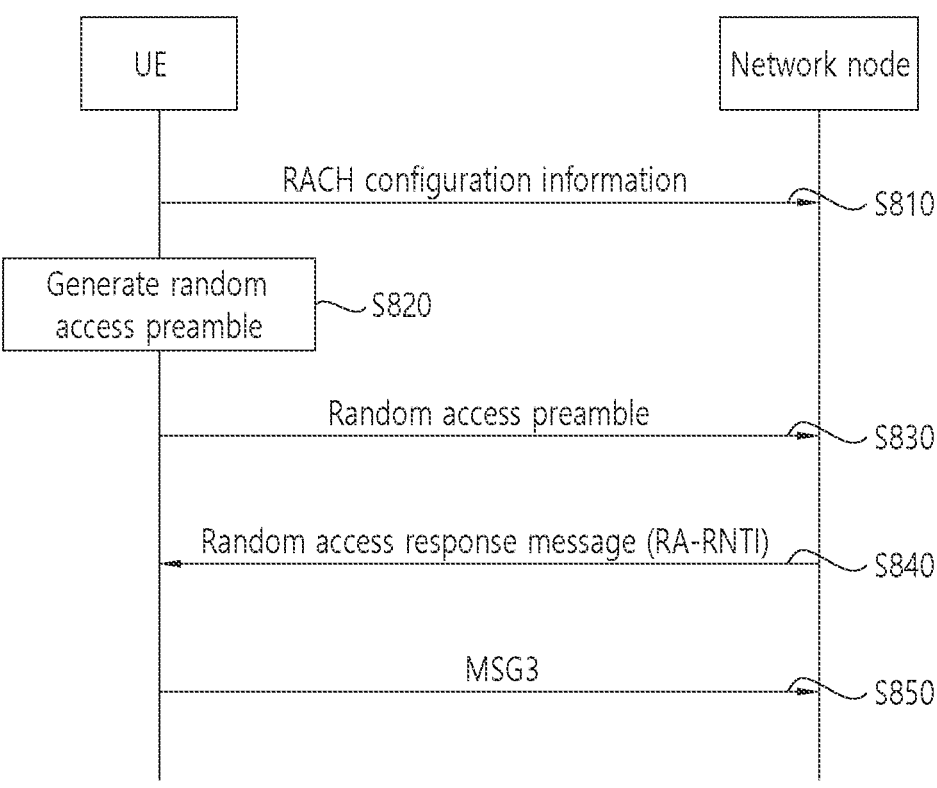
FIG. 8 is a flowchart illustrating an operation of a UE and a network node according to an embodiment.

FIG. 8 is a flowchart illustrating an operation of a UE and a network node according to an embodiment.

Referring to FIG. 8, a base station that performs communication by using a non-terrestrial network transmits RACH configuration information related to a non-terrestrial network cell to a UE (step S810). The RACH configuration information includes RACH related parameter information. For example, the RACH configuration information may include PRACH configuration index information, ZCZ configuration information, and random access response window information. In addition, the RACH configuration information may further include restricted set configuration information.

In one example, the ZCZ configuration information may be information that indicates a CS length or a CS value (Ncs), may be defined as the table below, for example. Table 2 represents Ncs values for the preamble format in the case that a subcarrier spacing for a random access transmission is 1.25 kHz.

TABLE 2

| ZCZ configuration | Ncs value | | |
| | Unrestricted set | Restricted set type A | Restricted set type B |
| --- | --- | --- | --- |
| 0 | 0 | 15 | 15 |
| 1 | 13 | 18 | 18 |
| 2 | 15 | 22 | 22 |
| 3 | 18 | 26 | 26 |
| 4 | 22 | 32 | 32 |
| 5 | 26 | 38 | 38 |

TABLE 2-continued

| ZCZ configuration | Ncs value | | |
| | Unrestricted set | Restricted set type A | Restricted set type B |
| --- | --- | --- | --- |
| 6 | 32 | 46 | 46 |
| 7 | 38 | 55 | 55 |
| 8 | 46 | 68 | 68 |
| 9 | 59 | 82 | 82 |
| 10 | 76 | 100 | 100 |
| 11 | 93 | 128 | 118 |
| 12 | 119 | 158 | 137 |
| 13 | 167 | 202 | — |
| 14 | 279 | 237 | — |
| 15 | 419 | — | — |

Referring to Table 2, the ZCZ configuration information may be 4-bit information that indicates a value of 0 to 15. For example, when the value indicated by the ZCZ configuration information is 11, a CS length may be 93 (in the case that the UE belongs to the unrestricted set), 128 (in the case that the UE belongs to restricted set A), or 118 (in the case that the UE belongs to restricted set B).

Here, whether the UE belongs to the unrestricted set, restricted set A, or restricted set B may be indicated to the UE from the network node by a separate signaling (for example, restricted set configuration information). For example, a restricted set may be a set of Ncs values which are used in the case that the UE moves at a high speed.

Meanwhile, in the case that the number of ZC sequences which may be generated by cycle-shifting a ZC sequence is restricted, but a cell radius is small, a delay difference is very small in a cell, and the ZC sequences may be distinguished even in the case that a small CS length is designed. However, in the case that the cell radius increases like NTN, the orthogonality between ZC sequences may be damaged due to the delay difference in a cell. Accordingly, to maintain the orthogonality between ZC sequences, the NTN communication system needs to be designed such that greater CS values are used than the CS values used in the NR communication system. That is, since a size of cell in the NTN communication system are much larger than a size of cell in the NR communication system, the cell in the NTN communication system needs a greater value than Ncs which is required in the NR communication system. A method of providing an additional Ncs for NTN is as below.

In another example, the ZCZ configuration information is information that indicates a CS length or a CS value (Ncs), may be defined as Table 3 below, for example. Table 3 represents Ncs values for the preamble format in the case that a subcarrier spacing for a random access transmission is 1.25 kHz.

TABLE 3

| ZCZ configuration | Ncs value | | |
| | Unrestricted set | Restricted set type A | Restricted set type B |
| --- | --- | --- | --- |
| 0 | 0 | 15 | 15 |
| 1 | 13 | 18 | 18 |
| 2 | 15 | 22 | 22 |
| 3 | 18 | 26 | 26 |
| 4 | 22 | 32 | 32 |
| 5 | 26 | 38 | 38 |
| 6 | 32 | 46 | 46 |
| 7 | 38 | 55 | 55 |
| 8 | 46 | 68 | 68 |

15

TABLE 3-continued

| ZCZ configuration | Ncs value | | |
| --- | --- | --- | --- |
| | Unrestricted set | Restricted set type A | Restricted set type B |
| 9 | 59 | 82 | 82 |
| 10 | 76 | 100 | 100 |
| 11 | 93 | 128 | 118 |
| 12 | 119 | 158 | 137 |
| 13 | 167 | 202 | $Rb_{13}$ |
| 14 | 279 | 237 | $Rb_{14}$ |
| 15 | 419 | $Ra_{15}$ | $Rb_{15}$ |
| 16 | $U_{16}$ | $Ra_{16}$ | $Rb_{16}$ |
| ... | ... | ... | ... |
| 29 | $U_{29}$ | $Ra_{29}$ | $Rb_{29}$ |
| 30 | $U_{30}$ | $Ra_{30}$ | $Rb_{30}$ |
| 31 | $U_{31}$ | $Ra_{31}$ | $Rb_{31}$ |

Referring to Table 3, the ZCZ configuration information may be 5-bit information that indicates a value of 0 to 31. That is, the ZCZ configuration information according to Table 3 corresponds to the embodiment in which 1 bit is added to the ZCZ configuration information according to Table 2, and additional Ncs is derived. For example, in the case that a value indicated by the ZCZ configuration information is 16, a CS length may be $U_{16}$ (in the case that the UE belongs to the unrestricted set), $Ra_{16}$ (in the case that the UE belongs to restricted set A), or $Rb_{16}$ (in the case that the UE belongs to restricted set B). Here, ZCZ configurations 0 to 15 may indicate Ncs values in the NR system, and ZCZ configurations 16 to 31 may indicate Ncs values in the NTN system. Alternatively, ZCZ configurations 0 to 15 may indicate Ncs values in the NR system, and ZCZ configurations 0 to 31 may indicate Ncs values in the NTN system. Accordingly, according to the present embodiment, Ncs values may be expanded by defining the ZCZ configuration information considering the NTN communication system, and the UE may generate the ZC sequence by obtaining the Ncs value in accordance with the coverage of the NTN system.

Here, whether the UE belongs to the unrestricted set, restricted set A, or restricted set B may be indicated to the UE from the network node by a separate signaling (for example, restricted set configuration information).

The UE may select Ncs according to at least one listed in Table 3 in the non-terrestrial network cell based on the RACH configuration information, more particularly, the ZCZ configuration information, and by using this, may generate a ZC sequence and a random access preamble (step S820).

The UE transmits the generated random access preamble to the network node (step S830). For example, the UE may perform the random access procedure to access the non-terrestrial network cell after receiving the system information. In this case, the UE may transmit by selecting one of a predetermined number of preambles by using the RACH configuration information.

Thereafter, the UE and the base station calculate RA-RNTI. Then, the network node transmits a random access response message including response information in response to the random access preamble to the UE (step S840). For example, the UE monitors whether to receive the random access response message in a random access response window which is configured based on the random access preamble transmission resource information. When the random access response message indicated by a temporal indicator related to the random access preamble transmission within the random access response window is received, the UE receives the random access response message.

Later, the UE transmits MSG 3 including request information that requests an RRC connection (step S850). For example, MSG 3 may include information of requesting a radio resource allocation which is required for an uplink transmission.

Figure 9:
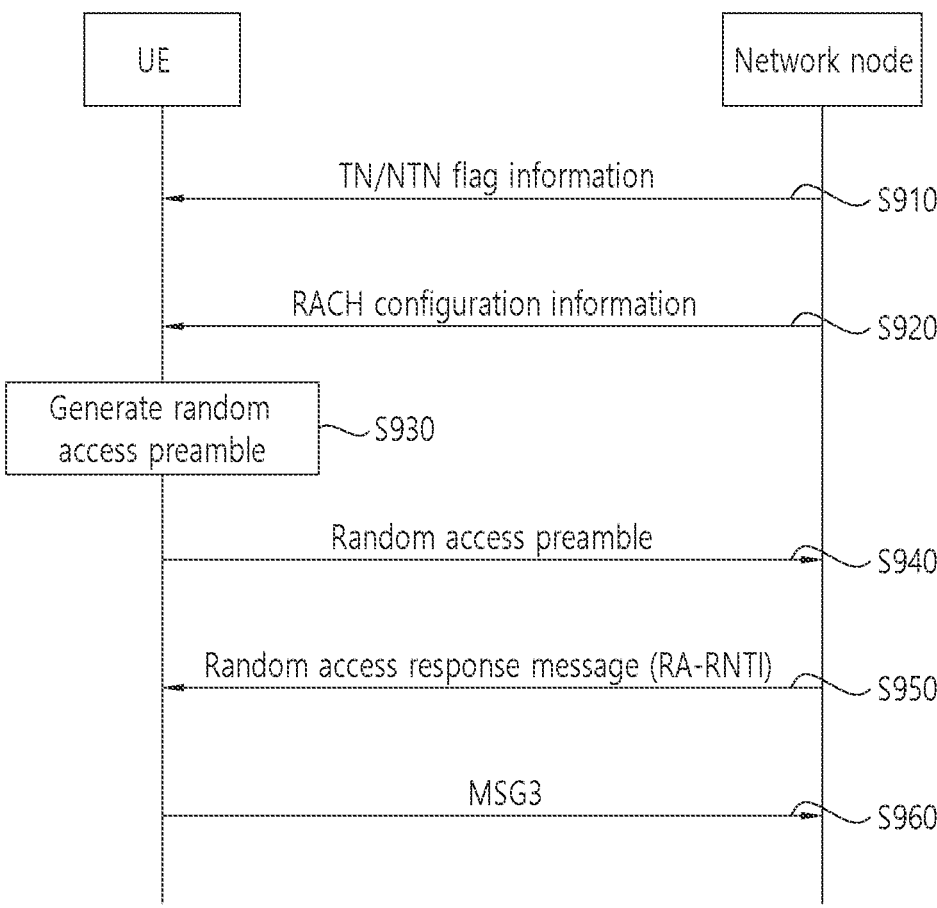
FIG. 9 is a flowchart illustrating an operation of a UE and a network node according to another embodiment.

FIG. 9 is a flowchart illustrating an operation of a UE and a network node according to another embodiment.

Referring to FIG. 9, a network node that performs communication by using a non-terrestrial network transmits TN/NTN flag information to a UE (step S910). The TN/NTN flag information is information for determining whether the network node (or cell) or the UE operates in TN or NTN mode, and may be transmitted by being included in an RRC message, a MAC message, or DCI. For example, the TN/NTN flag information may be included in the system information. The TN/NTN flag information may also be called Ncs table index information. The TN/NTN flag information may be 1 bit. The case that the value is 1 may indicate that the network node or the UE operates in the TN mode, and the case that the value is 0 may indicate that the network node or the UE operates in the NTN mode. Of course, the indication indicated by the TN/NTN flag information may be the opposite.

The TN/NTN flag information according to the present embodiment relates to a method of providing an additional Ncs for NTN to the UE, and the TN/NTN flag information may maintain the bit number of the ZCZ configuration information but design the Ncs table for the NR communication system and the Ncs' table for the NTN communication system separately (design a plurality of Ncs tables for each communication system or each coverage), and indicate the Ncs table to be used by separate signaling.

Specifically, according to the present embodiment, the Ncs table in the case of TN mode is configured as represented in Table 4, and the Ncs' table in the case of NTN mode is configured as represented in Table 5.

Table 4 represents the Ncs for the preamble format in the case that a subcarrier spacing for a random access transmission is 1.25 kHz.

TABLE 4

| ZCZ configuration | Ncs value | | |
| --- | --- | --- | --- |
| | Unrestricted set | Restricted set type A | Restricted set type B |
| 0 | 0 | 15 | 15 |
| 1 | 13 | 18 | 18 |
| 2 | 15 | 22 | 22 |
| 3 | 18 | 26 | 26 |
| 4 | 22 | 32 | 32 |
| 5 | 26 | 38 | 38 |
| 6 | 32 | 46 | 46 |
| 7 | 38 | 55 | 55 |
| 8 | 46 | 68 | 68 |
| 9 | 59 | 82 | 82 |
| 10 | 76 | 100 | 100 |
| 11 | 93 | 128 | 118 |
| 12 | 119 | 158 | 137 |
| 13 | 167 | 202 | — |
| 14 | 279 | 237 | — |
| 15 | 419 | — | — |

Referring to Table 4, the ZCZ configuration information may be 4-bit information that indicates a value of 0 to 15. For example, when the value indicated by the ZCZ configuration information is 11, a CS length may be 93 (in the case that the UE belongs to the unrestricted set), 128 (in the case that the UE belongs to restricted set A), or 118 (in the case that the UE belongs to restricted set B).

Here, whether the UE belongs to the unrestricted set, restricted set A, or restricted set B may be indicated to the UE from the network node by a separate signaling (for example, restricted set configuration information). A restricted set may be a set of Ncs values which are used in the case that the UE moves at a high speed.

Table 5 represents the Ncs' for the preamble format in the case that a subcarrier spacing for a random access transmission is 1.25 kHz.

TABLE 5

| ZCZ configuration | Ncs value | | |
| | Unrestricted set | Restricted set type A | Restricted set type B |
|---|---|---|---|
| 0 | $U_0$ | $Ra_0$ | $Rb_0$ |
| 1 | $U_1$ | $Ra_1$ | $Rb_1$ |
| 2 | $U_2$ | $Ra_2$ | $Rb_2$ |
| 3 | $U_3$ | $Ra_3$ | $Rb_3$ |
| 4 | $U_4$ | $Ra_4$ | $Rb_4$ |
| 5 | $U_5$ | $Ra_5$ | $Rb_5$ |
| 6 | $U_6$ | $Ra_6$ | $Rb_6$ |
| 7 | $U_7$ | $Ra_7$ | $Rb_7$ |
| 8 | $U_8$ | $Ra_8$ | $Rb_8$ |
| 9 | $U_9$ | $Ra_9$ | $Rb_9$ |
| 10 | $U_{10}$ | $Ra_{10}$ | $Rb_{10}$ |
| 11 | $U_{11}$ | $Ra_{11}$ | $Rb_{11}$ |
| 12 | $U_{12}$ | $Ra_{12}$ | $Rb_{12}$ |
| 13 | $U_{13}$ | $Ra_{13}$ | $Rb_{13}$ |
| 14 | $U_{14}$ | $Ra_{14}$ | $Rb_{14}$ |
| 15 | $U_{15}$ | $Ra_{15}$ | $Rb_{15}$ |

Referring to Table 5, $U_x$, the Ncs value, increases as x increases, this is the same as $Ra_x$ and $Rb_x$. For example, $U_x < Ra_x \leq Rb_x$. Here, when the TN/NTN flag information indicates 1, Table 4 may be used, and when the TN/NTN flag information indicates 0, Table 5 may be used. For example, when the ZCZ configuration information included in the RACH configuration information indicates 8 and the TN/NTN flag information indicates 0, $Ncs'=U_8$, $Ncs'=Ra_8$, or $Ncs'=Rb_8$.

The network node transmits the RACH configuration information related to a non-terrestrial network to the UE (step S920). The RACH configuration information includes RACH related parameter information. For example, the RACH configuration information may include PRACH configuration index information, ZCZ configuration information, and random access response window information. In addition, the RACH configuration information may further include restricted set configuration information.

The UE selects the Ncs according to at least one listed in Table 4 or Table 5 in a non-terrestrial network cell based on the RACH configuration information and the TN/NTN flag information, and by using this, generates a ZC sequence or a random access preamble (step S930).

The UE transmits the generated random access preamble to the network node (step S940). For example, the UE may perform the random access procedure to access the non-terrestrial network cell after receiving the system information. In this case, the UE may transmit by selecting one of a predetermined number of preambles by using the RACH configuration information.

Thereafter, the UE and the base station calculate RA-RNTI. Then, the network node transmits a random access response message including response information in response to the random access preamble to the UE (step S950). For example, the UE monitors whether to receive the random access response message in a random access response window which is configured based on the random access preamble transmission resource information. When the random access response message indicated by a temporal indicator related to the random access preamble transmission within the random access response window is received, the UE receives the random access response message.

Later, the UE transmits MSG 3 including request information that requests an RRC connection (step S960). For example, MSG 3 may include information of requesting a radio resource allocation which is required for an uplink transmission.

Figure 10:
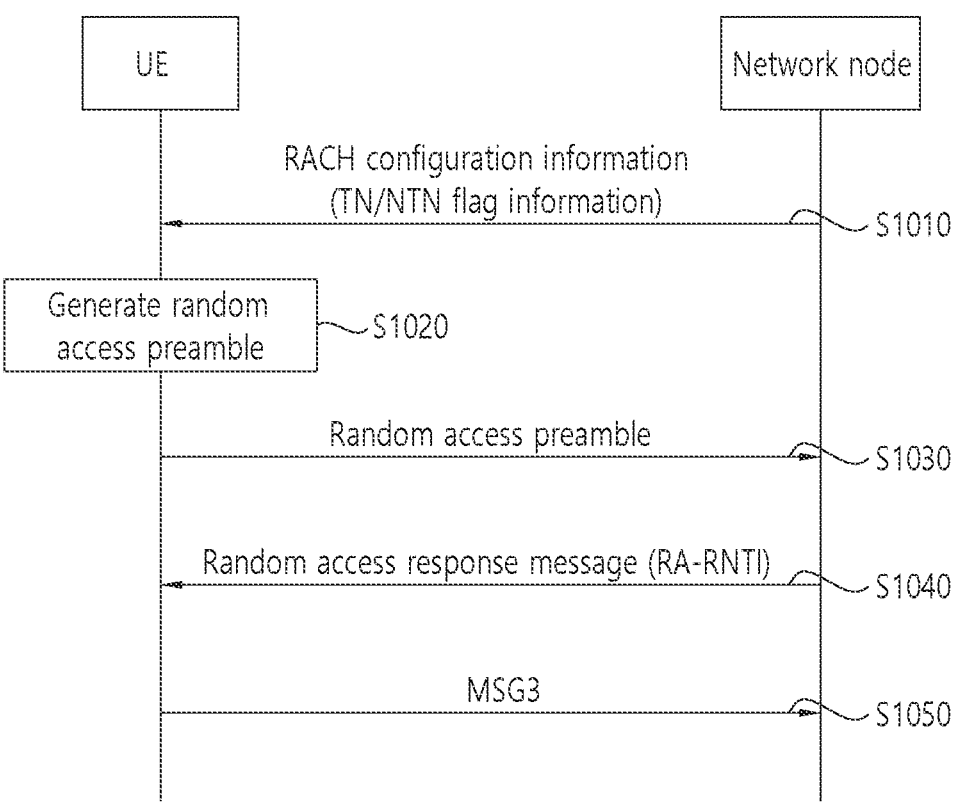
FIG. 10 is a flowchart illustrating an operation of a UE and a network node according to another embodiment.

FIG. 10 is a flowchart illustrating an operation of a UE and a network node according to another embodiment.

Referring to FIG. 10, a base station that performs communication by using a non-terrestrial network transmits RACH configuration information related to a non-terrestrial network cell to a UE (step S1010). The RACH configuration information includes RACH related parameter information. For example, the RACH configuration information may include PRACH configuration index information, ZCZ configuration information, and random access response window information. In addition, the RACH configuration information may further include restricted set configuration information and TN/NTN flag information.

The TN/NTN flag information is information for determining whether the network node (or cell) or the UE operates in TN or NTN mode, and may be transmitted by being included in an RRC message, a MAC message, or DCI. For example, the TN/NTN flag information may be included in the system information. The TN/NTN flag information may also be called Ncs table index information. The TN/NTN flag information may be 1 bit. The case that the value is 1 may indicate that the network node or the UE operates in the TN mode, and the case that the value is 0 may indicate that the network node or the UE operates in the NTN mode. Of course, the indication indicated by the TN/NTN flag information may be the opposite.

The TN/NTN flag information according to the present embodiment relates to a method of providing an additional Ncs for NTN to the UE, and the TN/NTN flag information may maintain the bit number of the ZCZ configuration information but design the Ncs table for the NR communication system and the Ncs' table for the NTN communication system separately (design a plurality of Ncs tables for each communication system or each coverage), and indicate the Ncs table to be used by separate signaling.

Specifically, according to the present embodiment, the Ncs table is configured as represented in Table 6, and the Ncs' table is configured as represented in Table 7.

Table 6 represents the Ncs for the preamble format in the case that a subcarrier spacing for a random access transmission is 1.25 kHz.

TABLE 6

| ZCZ configuration | Ncs value | | |
| | Unrestricted set | Restricted set type A | Restricted set type B |
|---|---|---|---|
| 0 | 0 | 15 | 15 |
| 1 | 13 | 18 | 18 |
| 2 | 15 | 22 | 22 |
| 3 | 18 | 26 | 26 |
| 4 | 22 | 32 | 32 |
| 5 | 26 | 38 | 38 |
| 6 | 32 | 46 | 46 |

TABLE 6-continued

| ZCZ configuration | Ncs value | | |
|---|---|---|---|
| | Unrestricted set | Restricted set type A | Restricted set type B |
| 7 | 38 | 55 | 55 |
| 8 | 46 | 68 | 68 |
| 9 | 59 | 82 | 82 |
| 10 | 76 | 100 | 100 |
| 11 | 93 | 128 | 118 |
| 12 | 119 | 158 | 137 |
| 13 | 167 | 202 | — |
| 14 | 279 | 237 | — |
| 15 | 419 | — | — |

Referring to Table 6, the ZCZ configuration information may be 4-bit information that indicates a value of 0 to 15. For example, when the value indicated by the ZCZ configuration information is 11, a CS length may be 93 (in the case that the UE belongs to the unrestricted set), 128 (in the case that the UE belongs to restricted set A), or 118 (in the case that the UE belongs to restricted set B).

Here, whether the UE belongs to the unrestricted set, restricted set A, or restricted set B may be indicated to the UE from the network node by a separate signaling (for example, restricted set configuration information). A restricted set may be a set of Ncs values which are used in the case that the UE moves at a high speed.

Table 7 represents the Ncs' for the preamble format in the case that a subcarrier spacing for a random access transmission is 1.25 kHz.

TABLE 7

| ZCZ configuration | Ncs value | | |
|---|---|---|---|
| | Unrestricted set | Restricted set type A | Restricted set type B |
| 0 | $U_0$ | $Ra_0$ | $Rb_0$ |
| 1 | $U_1$ | $Ra_1$ | $Rb_1$ |
| 2 | $U_2$ | $Ra_2$ | $Rb_2$ |
| 3 | $U_3$ | $Ra_3$ | $Rb_3$ |
| 4 | $U_4$ | $Ra_4$ | $Rb_4$ |
| 5 | $U_5$ | $Ra_5$ | $Rb_5$ |
| 6 | $U_6$ | $Ra_6$ | $Rb_6$ |
| 7 | $U_7$ | $Ra_7$ | $Rb_7$ |
| 8 | $U_8$ | $Ra_8$ | $Rb_8$ |
| 9 | $U_9$ | $Ra_9$ | $Rb_9$ |
| 10 | $U_{10}$ | $Ra_{10}$ | $Rb_{10}$ |
| 11 | $U_{11}$ | $Ra_{11}$ | $Rb_{11}$ |
| 12 | $U_{12}$ | $Ra_{12}$ | $Rb_{12}$ |
| 13 | $U_{13}$ | $Ra_{13}$ | $Rb_{13}$ |
| 14 | $U_{14}$ | $Ra_{14}$ | $Rb_{14}$ |
| 15 | $U_{15}$ | $Ra_{15}$ | $Rb_{15}$ |

Referring to Table 7, Ux, the Ncs value, increases as x increases, this is the same as Rax and Rbx. For example, $Ux < Rax \leq Rbx$. Here, when the TN/NTN flag information indicates 1, Table 6 may be used, and when the TN/NTN flag information indicates 0, Table 7 may be used. For example, when the ZCZ configuration information included in the RACH configuration information indicates 8 and the TN/NTN flag information indicates 0, Ncs'=$U_8$, Ncs'=$Ra_8$, or Ncs'=$Rb_8$.

The UE may select Ncs according to at least one listed in Table 6 or Table 7 in the non-terrestrial network cell based on the RACH configuration information, more particularly, the ZCZ configuration information, and by using this, may generate a ZC sequence and a random access preamble (step S1020).

The UE transmits the generated random access preamble to the network node (step S1030). For example, the UE may perform the random access procedure to access the non-terrestrial network cell after receiving the system information. In this case, the UE may transmit by selecting one of a predetermined number of preambles by using the RACH configuration information.

Thereafter, the UE and the base station calculate RA-RNTI. Then, the network node transmits a random access response message including response information in response to the random access preamble to the UE (step S1040). For example, the UE monitors whether to receive the random access response message in a random access response window which is configured based on the random access preamble transmission resource information. When the random access response message indicated by a temporal indicator related to the random access preamble transmission within the random access response window is received, the UE receives the random access response message.

Later, the UE transmits MSG 3 including request information that requests an RRC connection (step S1050). For example, MSG 3 may include information of requesting a radio resource allocation which is required for an uplink transmission.

Figure 11:
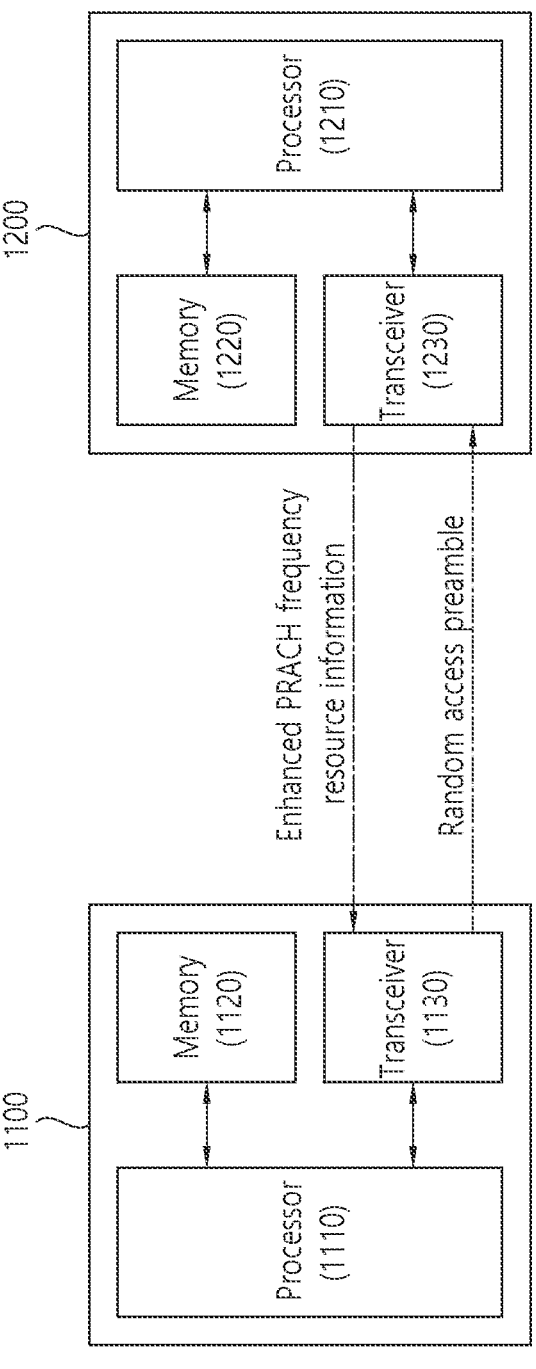
FIG. 11 illustrates a UE and a network node for which the embodiment of the present disclosure is implemented.

FIG. 11 illustrates a UE and a network node for which the embodiment of the present disclosure is implemented.

Referring to FIG. 11, a UE 1100 includes a processor 1110, a memory 1120, and a transceiver 1130. The processor 1110 may be configured to implement the function, process, and/or method described in FIG. 8 and the present disclosure. The layers in a radio interface protocol may be implemented in the processor 1110.

The memory 1120 is connected to the processor 1110 and stores various types of information to drive the processor 1110. The transceiver 1130 is connected to the processor 1110 and transmits a radio signal to a network node 1200 or receives a radio signal from the network node 1200.

The network node 1200 includes a processor 1210, a memory 1220, and a transceiver 1230. In the present embodiment, the network node 1200 is a non-terrestrial network node and may include an artificial satellite that performs a radio access procedure according to the present disclosure. Alternatively, in the present embodiment, the network node 1200 is a terrestrial network node and may include a base station that performs a radio access procedure according to the present disclosure.

The processor 1210 may be configured to implement the function, process, and/or method described in FIG. 8 and the present disclosure. The layers in a radio interface protocol may be implemented in the processor 1210. The memory 1220 is connected to the processor 1210 and stores various types of information to drive the processor 1210. The transceiver 1230 is connected to the processor 1210 and transmits a radio signal to the UE 1100 or receives a radio signal from the UE 1100.

The processor 1110 or 1210 may include an application-specific integrated circuit (ASIC), other chipsets, logic circuits, and/or data processing devices. The memory 1120 or 1220 may include a read-only memory (ROM), a random access memory (RAM), a flash memory, a memory card, a storage medium, and/or other storage devices. The transceiver 1130 or 1230 may include a baseband circuit for processing a radio signal. When an embodiment of the present disclosure is implemented as software, the above-described technique may be implemented as a module (a process, a function, etc.) that performs the above-described functions. The module may be stored in the memory 1120 or 1220 and executed by the processor 1110 or 1210. The memory 1120 or 1220 may be provided inside or outside the processor 1110 or 1210 and may be connected to the processor 1110 or 1210 by various well-known means.

In the exemplary system described above, the methods are described as a series of steps or blocks based on flowcharts, but the present disclosure is not limited to the order of steps, and some steps may occur in a different order or concurrently with other steps as described above. In addition, those skilled in the art will understand that the steps shown in the flowcharts are not exclusive and that other steps may be included or one or more steps in the flowcharts may be deleted without affecting the scope of the present disclosure.

What is claimed is:

1. A method for performing wireless transmission and reception, performed by a user equipment (UE), the method comprising:

receiving, from a network node, random access channel (RACH) configuration information, wherein the RACH configuration information includes zero correlation zone (ZCZ) configuration information that indicates at least one cyclic shift value among a plurality of cyclic shift values used for generating a random access preamble, wherein the plurality of cyclic shift values are divided into a first set and a second set according to a cell coverage applied thereto, and wherein the second set is applied to a cell coverage larger than the first set;

generating a random access preamble based on a cyclic shift (Ncs) value of the at least one cyclic shift value;

transmitting, to the network node, the random access preamble;

receiving, from the network node, a response message in response to the random access preamble; and transmitting, to the network node, a message based on the response message, wherein the first set is applied to a cell of a terrestrial network (TN), and the second set is applied to a cell of a non-terrestrial network (NTN), wherein the ZCZ configuration information is configured with a 5-bit field that indicates an index between 0 to 31, wherein the RACH configuration information further includes restricted set configuration information that represents whether the UE belongs to one of an unrestricted set, a restricted set A, or a restricted set B, and wherein the random access preamble is determined based on a combination of the Ncs value and the restricted set configuration information.

2. The method of claim 1, wherein the generating the random access preamble includes:

generating a Zadoff-Chu (ZC) sequence based on the Ncs value; and generating the random access preamble by using the ZC sequence.

3. The method of claim 1, wherein the Nos value is included in the first set when the index is 0 to 15, and wherein the Nos value is included in the second set when the index is 0 to 31.

4. The method of claim 1, further comprising:

receiving, from the network node, flag information that indicates whether a set of cyclic shift values used by the network node or the UE is the first set or the second set.

5. The method of claim 1, wherein the RACH configuration information further includes flag information that indicates whether a set of cyclic shift values used by the network node or the UE is the first set or the second set.

6. A user equipment (UE) for performing wireless transmission and reception, the UE comprising:

a transceiver configured to:

receive, from a network node, random access channel (RACH) configuration information, wherein the RACH configuration information includes zero correlation zone (ZCZ) configuration information that indicates at least one cyclic shift value among a plurality of cyclic shift values used for generating a random access preamble, wherein the plurality of cyclic shift values is divided into a first set and a second set according to a cell coverage applied thereto, and wherein the second set is applied to a cell coverage larger than the first set, transmit, to the network node, the random access preamble, receive, from the network node, a response message in response to the random access preamble, and transmit, to the network node, a message based on the response message; and a processor configured to generate the random access preamble based on a cyclic shift (Ncs) value of the at least one cyclic shift value, wherein the first set is applied to a cell of a terrestrial network (TN), and the second set is applied to a cell of a non-terrestrial network (NTN), wherein the ZCZ configuration information is configured with a 5-bit field that indicates an index between 0 to 31, wherein the RACH configuration information further includes restricted set configuration information that represents whether the UE belongs to one of an unrestricted set, a restricted set A, or a restricted set B, and wherein the random access preamble is determined based on a combination of the Ncs value and the restricted set configuration information.

7. The UE of claim 6, wherein the processor is further configured to:

generate a Zadoff-Chu (ZC) sequence based on the Ncs value; and generate the random access preamble by using the ZC sequence.

8. The UE of claim 6, wherein the Ncs value is included in the first set when the index is 0 to 15, and wherein the Ncs value is included in the second set when the index is 0 to 31.

9. The UE of claim 6, wherein the transceiver is further configured to receive, from the network node, flag information that indicates whether a set of cyclic shift values used by the network node or the UE is the first set or the second set.

10. A method for performing wireless transmission and reception, performed by a network node, the method comprising:

transmitting, to a user equipment (UE), random access channel (RACH) configuration information, wherein the RACH configuration information includes zero correlation zone (ZCZ) configuration information that indicates at least one cyclic shift value among a plurality of cyclic shift values used for generating a random access preamble, wherein the plurality of cyclic shift values is divided into a first set and a second set according to a cell coverage applied thereto, and wherein the second set is applied to a cell coverage larger than the first set;

receiving, from the UE, the random access preamble generated based on a cyclic shift (Ncs) value of the at least one cyclic shift value;

transmitting, to the UE, a response message in response to the random access preamble; and receiving, from the UE, a message transmitted based on the response message, wherein the first set is applied to a cell of a terrestrial network (TN), and the second set is applied to a cell of a non-terrestrial network (NTN), wherein the ZCZ configuration information is configured with a 5-bit field that indicates an index between 0 to 31, wherein the RACH configuration information further includes restricted set configuration information that represents whether the UE belongs to one of an unrestricted set, a restricted set A, or a restricted set B, and wherein the random access preamble is determined based on a combination of the Ncs value and the restricted set configuration information.

\* \* \* \* \*